US008559199B2

(12) United States Patent
Rincent et al.

(10) Patent No.: US 8,559,199 B2
(45) Date of Patent: Oct. 15, 2013

(54) POWER FACTOR CORRECTION CIRCUIT FOR THREE-PHASE POWER SUPPLY

(75) Inventors: Michel Rincent, Issy les Moulineaux (FR); Pierre Esposito, Saint-Mande (FR); Charles Richardeau, Mortagne-sur-Sevre (FR)

(73) Assignee: Thales, Neuilly sur Seine (FR)

( * ) Notice: Subject to any disclaimer, the term of this patent is extended or adjusted under 35 U.S.C. 154(b) by 513 days.

(21) Appl. No.: 12/809,994

(22) PCT Filed: Dec. 19, 2008

(86) PCT No.: PCT/EP2008/068066
§ 371 (c)(1),
(2), (4) Date: Oct. 26, 2010

(87) PCT Pub. No.: WO2009/083504
PCT Pub. Date: Jul. 9, 2009

(65) Prior Publication Data
US 2011/0032737 A1    Feb. 10, 2011

(30) Foreign Application Priority Data

Dec. 21, 2007    (FR) ..................................... 07 09029

(51) Int. Cl.
*H02M 1/12*    (2006.01)
*G05F 1/70*    (2006.01)

(52) U.S. Cl.
USPC ........................................... 363/44; 323/207

(58) Field of Classification Search
USPC ........... 363/44, 47, 48, 81, 89, 124, 125, 126; 323/205, 206, 207, 208
See application file for complete search history.

(56) References Cited

U.S. PATENT DOCUMENTS

| 5,195,232 A | 3/1993 | Frederick |
| 5,319,343 A * | 6/1994 | Jeffries .......................... 336/181 |
| 5,969,583 A | 10/1999 | Hutchison |
| 6,642,672 B2 * | 11/2003 | Hu et al. ........................ 315/276 |
| 6,984,964 B2 * | 1/2006 | Chang ............................ 323/207 |
| 2006/0250207 A1 | 11/2006 | Shudarek |

FOREIGN PATENT DOCUMENTS

WO    96/24983 A1    8/1996

OTHER PUBLICATIONS

Kolar et al., "Space Vector-Based Analytical Analysis of the Input Current Distortion of a Three-Phase Discontinuous-Mode Boost Rectifier System", IEEE, Power electronics, vol. 10, No. 6. Nov. 1995, pp. 733-745.*
Kolar J W et al.: "A Comprehensive Design Approach for a Three-Phase High-Frequency Single-Switch Discontinuous-Mode Boost Power Factor Corrector Based on Analytically Derived Normalized Converter Component Ratings," Conference Record of the Industry Applications Conference IAS Annual Meeting. Toronto, Oct. 3-8, 1993;New York, IEEE, US, vol. Part 02, Oct. 3, 1993, pp. 931-938.
Jang Y et al.: "A novel, robust, harmonic injection method for single-switch, three-phase, discontinuous-conduction-mode boost rectifiers," 19970622; 19970622-19970627, vol. 1, Jun. 22, 1997, pp. 469-475.

* cited by examiner

*Primary Examiner* — Gary L Laxton
(74) *Attorney, Agent, or Firm* — Baker & Hostetler LLP

(57) ABSTRACT

A power-factor correction circuit for a three-phase power supply is provided. The correction circuit includes a filtering unit at the input receiving the three phases of the current, at least one inductor per phase placed downstream of the filtering unit, a rectifying bridge powering a current-chopping stage. The filtering unit includes a differential-mode filtering cell including at least one inductive circuit formed of a single magnetic material in a double E, each leg of the E being surrounded by a winding.

5 Claims, 8 Drawing Sheets

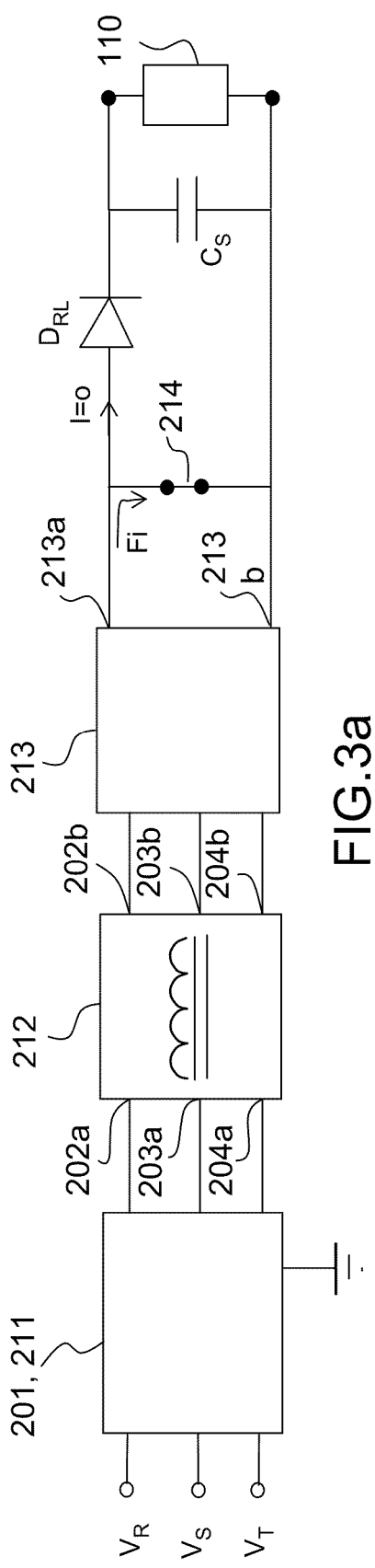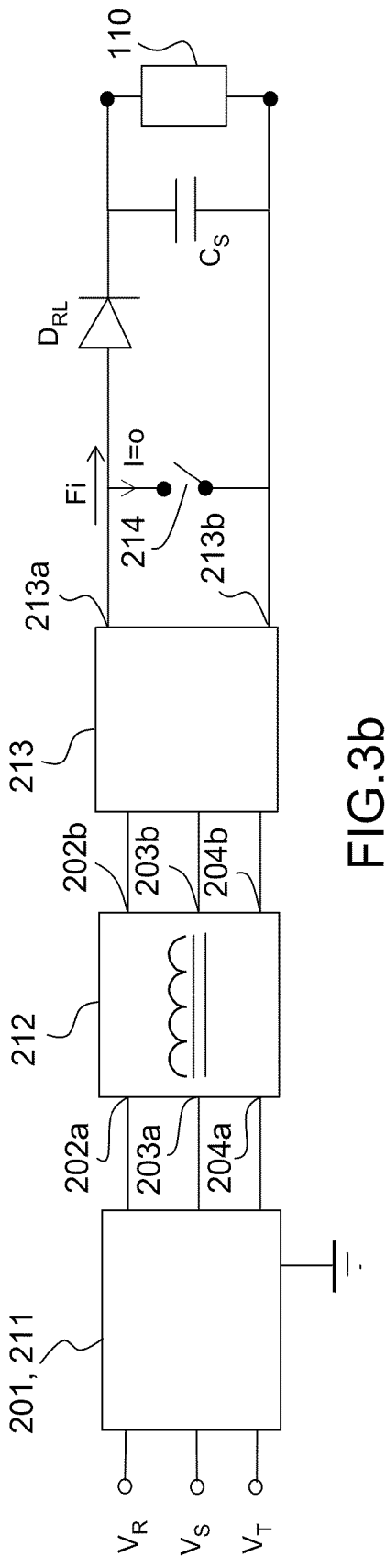

POWER FACTOR CORRECTION CIRCUIT FOR THREE-PHASE POWER SUPPLY

CROSS-REFERENCE TO RELATED APPLICATIONS

This application is a National Stage of International Patent Application No. PCT/EP2008/068066, filed on Dec. 19, 2008, which claims priority to foreign Patent Application No. FR 07 09029, filed on Dec. 21, 2007, the disclosures of which are incorporated herein by reference in their entirety.

FIELD OF THE INVENTION

The present invention relates to a power-factor correction circuit for a three-phase power supply. The invention applies notably to the field of power electronics, in particular the production of three-phase power supply units.

BACKGROUND OF THE INVENTION

A power electronic circuit sometimes introduces a reactive power causing a phase shift of the power supply current and voltage. Moreover, one or more conversion stages present in said electronic circuit, for example a stage for rectifying the voltage, cause deformations of the input current, consequently degrading the power factor. The power electronic circuit therefore requires, at its input, the addition of a correction circuit in order to increase the power factor.

On the one hand, the correction circuit, indicated by the acronym PFC in the rest of the description with reference to the expression "Power Factor Correction", must put the current and the voltage back into phase. On the other hand, the PFC circuit must limit the harmonic distortions of the input current. Therefore, a PFC circuit must at least meet two constraints simultaneously: obtain a high power factor and a good quality of the induced-current harmonic distortion. The new standards, notably concerning purity in current shape are increasingly strict, as shown, for example, by the chapters relating to conducted emissions of the MIL-STD-461E standard of the American Defense Department.

To meet the aforementioned strict constraints with applications powered by a three-phase current, it is natural to juxtapose three PFC stages, one for each phase of the electric current. However, although this solution makes it possible to achieve good performance, both in terms of harmonic distortion and in terms of power factor, it culminates in a complex architecture, notably because of the balancing difficulties between the three PFC stages. Moreover, the resultant circuit is bulky because of the gearing-down of the components to be used.

An alternative solution using the principle of the PFC circuits of the "boost" type is shown in FIG. 1. It is a conventional correction circuit 100 for a three-phase power supply comprising a first filtering unit 101 dedicated to the low frequencies, a hexaphase rectifying bridge 102, a second filtering unit 103 dedicated to the high frequencies, and a voltage step-up stage 104, which comprises an inductor 105, a controlled switch 106, and a freewheel diode 107 powering a reservoir capacitor C. The value of the inductor 105 is chosen to be sufficiently large for the circuit 100 to operate in continuous mode. The capacitor C is a reserve of energy making it possible to power a user circuit, modeled in FIG. 1 by a load 110. This conventional correction circuit 100 makes it possible, without having recourse to three PFC stages, to significantly increase the power factor of the circuit. However, since the value of the inductor 105 has to be high to obtain an acceptable smoothing of the current, the inductive component chosen to fulfill this role is often very bulky. Moreover, in practice, the architecture of this circuit shows its limits in quality of the harmonic distortions; it does not make it possible to satisfy the requirements of the strictest standards.

Other solutions have been proposed, notably a circuit shown in the patent referenced U.S. Pat. No. 6,984,964 by the applicant Delta Electronics Inc. This circuit, designed for a three-phase power supply, makes it possible to obtain low levels of harmonic distortion while maintaining a high power factor. However, this circuit is particularly costly, because it requires the use of a Digital Signal Processor or DSP, and a complex programmable circuit or CPLD ("Complex Programmable Logic Device"), in order to control the backflows of current toward the input of the circuit notably when the neutral of the three-phase network is not connected to the circuit. Moreover, it is necessary to have 3 distinct PFC functions, one per phase in order to perform the "PFC" function making it possible to obtain all at the same time a power factor close to the unit combined with a low input-current harmonic distortion, for example in order to satisfy the requirement of the CE101 test of the MIL-STD-461E standard.

SUMMARY OF THE INVENTION

One object of the invention is to propose a PFC circuit making it possible to comply with the strict requirements relating to the power factor and to levels of harmonic distortions, while limiting the size of said PFC circuit and its cost. Accordingly, the subject of the invention is a correction circuit of the power factor of a circuit for a three-phase electric network comprising a filtering unit at the input receiving the three phases of the current, at least one inductor per phase placed downstream of the filtering unit, a rectifying bridge powering a current-chopping stage, characterized in that the filtering unit comprises a differential-mode filtering cell comprising at least one inductive circuit formed of a single magnetic material in a double E, each leg of the E being surrounded by a winding, the values of the inductors being chosen so that said correction circuit operates at the boundary between the continuous mode and the discontinuous mode.

According to one embodiment, the filtering unit comprises a first common-mode filtering cell, associated in series with a first differential-mode filtering cell and a second differential-mode filtering cell, the filtering unit also comprising a second common-mode filtering cell comprising a mid-point output and inserted between the first differential-mode filtering cell and the second differential-mode filtering cell.

According to one embodiment, the second differential-mode filtering cell comprises simple inductors and the assembly of the differential-mode inductors is incorporated into a molded resin block, said assembly consisting of the inductive modules and of the simple inductors of the first differential-mode filtering cell and of the simple inductors of the second differential-mode filtering cell.

A further subject of the invention is a power supply unit comprising a power-factor correction circuit as described above.

Unlike the PFC circuits of the prior art, the circuit according to the invention is unitary, that is to say that it comprises a single PFC circuit operating in three-phase mode. This feature has several advantages. On the one hand, it makes it possible to reduce the overall size of the circuit by a factor of 3. On the other hand, it makes it possible to solve the problems of balancing the phases, whether or not the neutral of the three-phase network is connected to the circuit. Moreover, an additional architecture requiring computing modules such as a DSP or a CPLD is no longer necessary.

BRIEF DESCRIPTION OF THE DRAWINGS

Other features will appear on reading the following detailed description given as a non-limiting example with respect to the appended drawings which represent.

DETAILED DESCRIPTION

For the purposes of clarity of the description, the same reference numbers in the various figures designate the same elements.

Figure 2:
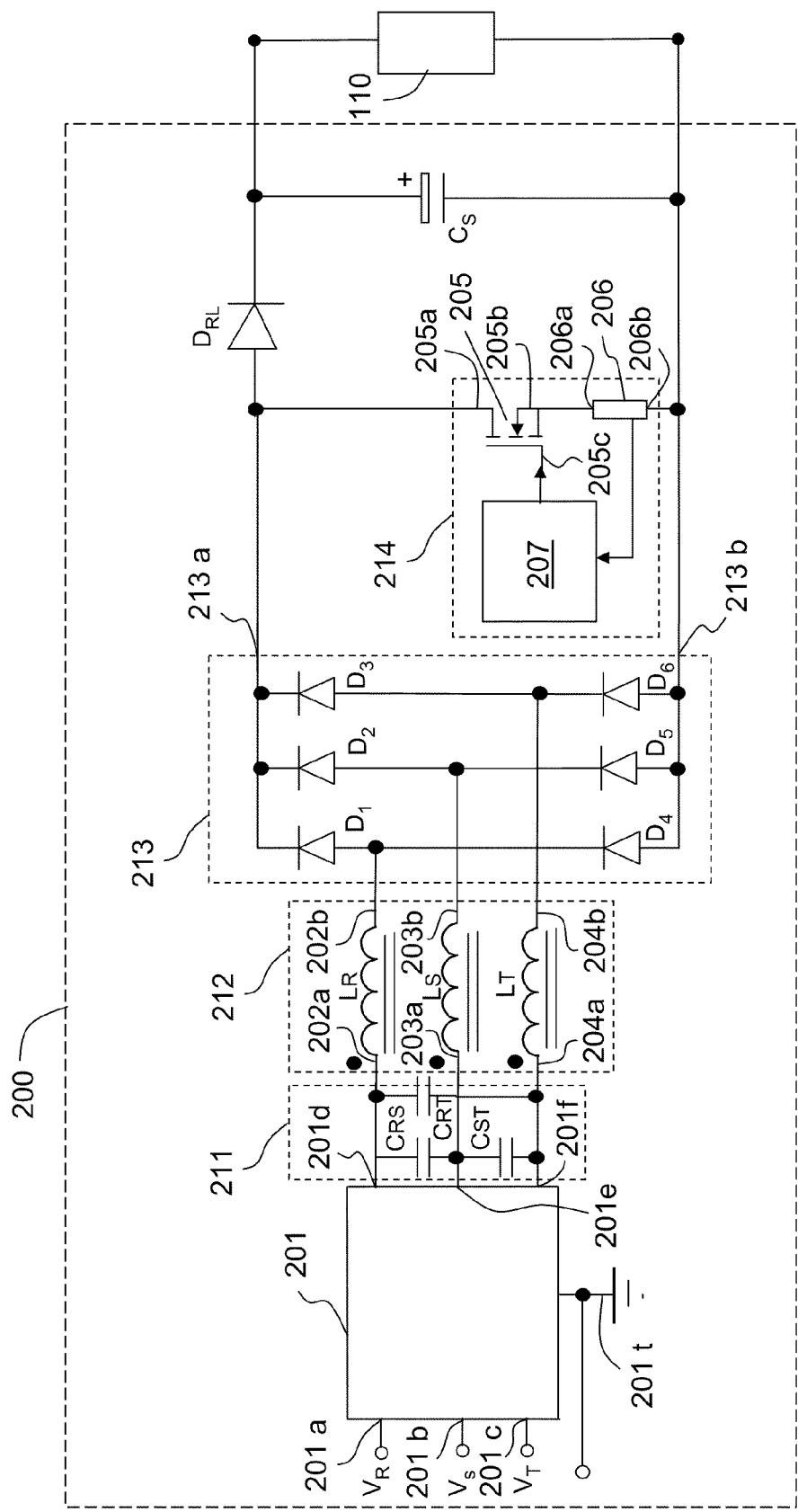

FIG. 2 shows the architecture of an embodiment of the correction circuit according to the invention.

The correction circuit 200 of FIG. 2 comprises a filtering unit 201 comprising three inputs 201a, 201b, 201c and three outputs 201d, 201e, 201f. The filtering unit 201 is powered by three current phases, a first phase $V_R$ on the first input 201a, a second phase $V_S$ on the second input 201b, and a third phase $V_T$ on the third input 201c. Moreover, the filtering unit 201 is connected to ground 201t. This filtering unit 201 will be explained in detail below in FIGS. 3, 5, 6a and 6b.

A filtering stage 211, making it possible to reject high-frequency components generated by the chopping of the current carried out by the PFC stage 214 described below, is placed in series at the output of the filtering unit 201. More precisely, in the example of FIG. 2, the first output 201d of the filtering unit 201 is connected to its second output 201e via a first capacitor $C_{RS}$, its second output 201e is connected to its third output 201f via a second capacitor $C_{ST}$, and its third output 201f is connected to its first output 201d via a third capacitor $C_{RT}$. According to another embodiment, the high-frequency filtering stage 211 is incorporated into the filtering unit 201.

An inductive stage 212 is placed at the output of the high-frequency signal filtering stage 211. More precisely, in the example of FIG. 2, the first output 201e of the filtering unit 201 is connected to the first terminal 202a of a first inductor $L_R$; the second output 201e of the filtering unit 201 is connected to the first terminal 203a of a second inductor $L_S$; the third output 201f of the filtering unit 201 is connected to the first terminal 204a of a third inductor $L_T$.

The inductors $L_R$, $L_S$ and $L_T$ are connected to a diode bridge 213 for rectifying the voltage. More precisely, in the example of FIG. 2, the second terminal 202b of the first inductor $L_R$ is connected to the anode of a first diode $D_1$; the second terminal 203b of the second inductor $L_S$ is connected to the anode of a second diode $D_2$; the second terminal 204b of the third inductor $L_T$ is connected to the anode of a third diode $D_3$. Moreover, the anode of the first diode is connected to the cathode of a fourth diode $D_4$; the anode of the second diode $D_2$ is connected to the cathode of a fifth diode $D_5$; the anode of the third diode is connected to the cathode of a sixth diode $D_6$. The diode bridge 213 comprises two outputs 213a, 213b. The cathodes of the first diode $D_1$, of the second diode $D_2$ and of the third diode $D_3$ are connected together at the first output 213a of the diode bridge 213. The anodes of the fourth diode $D_4$, of the fifth diode $D_5$ and of the sixth diode $D_6$ are connected together at the second output 213b of the diode bridge 213.

The first output 213a of the diode bridge 213 is connected to the second output 213b via a controlled switch 214. In the example, the controlled switch 214 is formed by an MOSFET (Metal Oxide Semiconductor Field Effect Transistor) transistor 205 the drain 205a of which is connected to the first output 213a of the diode bridge 213, the source 205b of which is connected to the first terminal 206a of a shunt resistor 206, and the gate 205c of which is controlled by a chopping signal generator 207. In the example, this generator 207 is a pulse width modulation generator, a signal at the low state causing a disabling of the MOSFET 205, a signal at the high state controlling the flow of the current through the MOSFET 205. The frequency of transmission of said pulses is very much higher than the frequency of the current originating from each of the input phases $V_R$, $V_S$ and $V_T$. For example, the frequency of transmission of the pulses is of the order of 125 kHz for a network current at 400 Hz. The second terminal 206b of the shunt resistor 206 is connected to the second output 213b of the diode bridge 213. This resistor 206 of very low value makes it possible to measure the current originating from the source 205b of the MOSFET 205 in order to adapt the width of the pulses transmitted by the generator 207.

Moreover, a freewheel diode $D_{RL}$ is placed so that its anode is connected to the first output 213a of the diode bridge 213 and to the drain 205a of the transistor 205.

Finally, a reservoir capacitor Cs is placed at the end of the circuit in order to store the energy necessary for the user circuit 110 to be powered, including in the event of a transient cut-out of the input AC network; the first terminal of this capacitor Cs being connected to the cathode of the freewheel diode $D_{RL}$, the second terminal of this capacitor being connected to the second output 213b of the diode bridge 213.

The correction circuit of FIG. 2 operates according to a two-phase cycle: a first phase during which the controlled switch 214 is closed, and a second phase during which the controlled switch 214 is open.

The first phase is illustrated in FIG. 3a. The controlled switch 214 being closed, a short circuit is formed at the branch comprised between the first output 213a of the diode bridge 213 and its second output 213b. The current, shown in FIG. 3a by an arrow Fi, therefore flows through this branch 213a, 213b as a short circuit and allows the inductors $L_R$, $L_S$, $L_T$ to store magnetic energy. In parallel, the freewheel diode $D_{RL}$ is disabled and the current passing through said diode $D_{RL}$ is zero.

This magnetic energy stored by the inductors $L_R$, $L_S$ and $L_T$ is restored by the capacitor Cs during the second phase of the cycle, as illustrated in FIG. 3b. The current, represented in the figure by an arrow Fi, is transmitted in full to the freewheel diode $D_{RL}$.

The values of the inductors $L_R$, $L_S$ and $L_T$ are optimized in order to limit the need for low-frequency signal filtering carried out by the filtering unit 201, without degrading the input-current harmonic distortion.

The values of the inductors $L_R$, $L_S$, $L_T$ are preferably chosen so that the correction circuit 200 operates at the boundary between the continuous mode and the discontinuous mode, in other words, the inductors $L_R$, $L_S$, $L_T$ finish discharging at the moment of beginning the first phase of the cycle. The lower the value of each of the inductors $L_R$, $L_S$, $L_T$, the more attenuated must be the inversion of the high-frequency current originating from the chopping carried out by the controlled switch 214 in order to maintain the high-frequency conducted emission requirements and hence the greater must be the attenuation of the filtering carried out by the filtering unit 201 in order to limit the harmonic distortions of the input current.

By contrast, the higher the value of the inductors $L_R$, $L_S$ and $L_T$, the higher the risk of degrading the low-frequency harmonic distortion (that is to say the frequency of the network and its near harmonics). If the values for the inductors $L_R$, $L_S$ and $L_T$ are too high, they would lead to a degradation of the envelope signal of the input current. Then, in order to preserve the shape of this envelope signal, it would be necessary to significantly increase the low-frequency filtering volume.

Thus, the optimized value of the inductors $L_R$, $L_S$ and $L_T$ is chosen to reconcile the following two requirements: to obtain a low line-current distortion at the frequencies close to the frequency of the network and to satisfy the high-frequency requirements with respect to the pollution generated by the chopping.

Figure 4A:
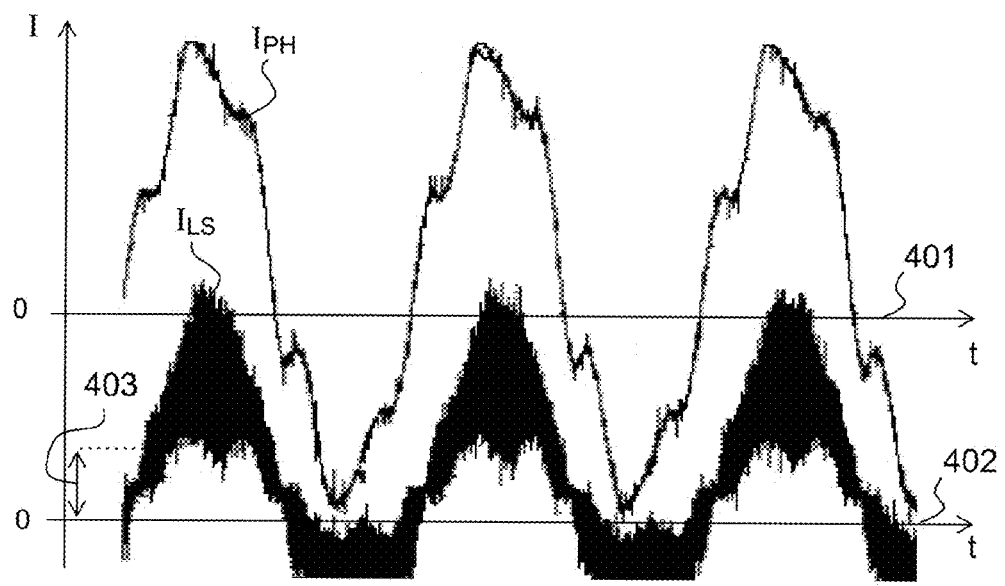

FIG. 4a illustrates, over time t, the shape of the phase current $I_{PH}$ of the second phase of the network and the shape of the current $I_{LS}$ passing through the second inductor $L_S$, the shape of the current passing through the other inductors $L_R$ and $L_T$ being similar. The current $I_{PH}$ is represented with respect to a first axis 401, while the current of inductor $I_{LS}$ is represented with respect to a second axis 402. When the current sine curve is close to the maximum, a plateau 403, forming a continuous component of the current $I_{LS}$, appears. The obtained shape of the inductor current $I_{LS}$, in particular the plateau 403 and the phase relative to the current $I_{PH}$ is due to the abovementioned optimization of the value of the inductors $L_R$, $L_S$, $L_T$. With this optimization, the current $I_{PH}$ is marked by a harmonic distortion equal to approximately 15%, or a significant improvement over a circuit of the prior art (from 40% to 25% distortion, depending on the power to be delivered), as illustrated in FIG. 4a.

Figure 4B:
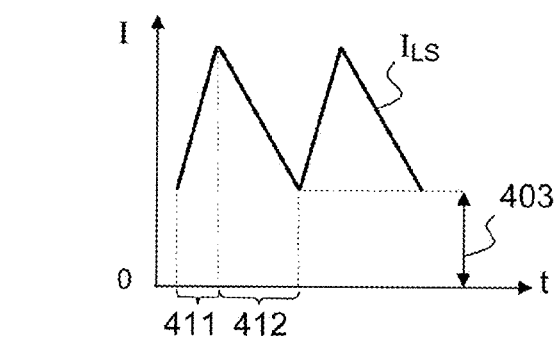

FIG. 4b is a closer view of the shape of the current $I_{LS}$ of inductor $L_S$ previously shown in FIG. 4a. The current increases linearly during the first phase 411 of the chopping cycle. Then, during the second phase 412, the inductor discharges and the current reduces as far as to cancel itself out, the current again increasing after the elapsing of the period T of the cycle. The current in each inductor $L_R$, $L_S$, $L_T$ therefore takes the shape of a succession of triangles.

Figure 4C:
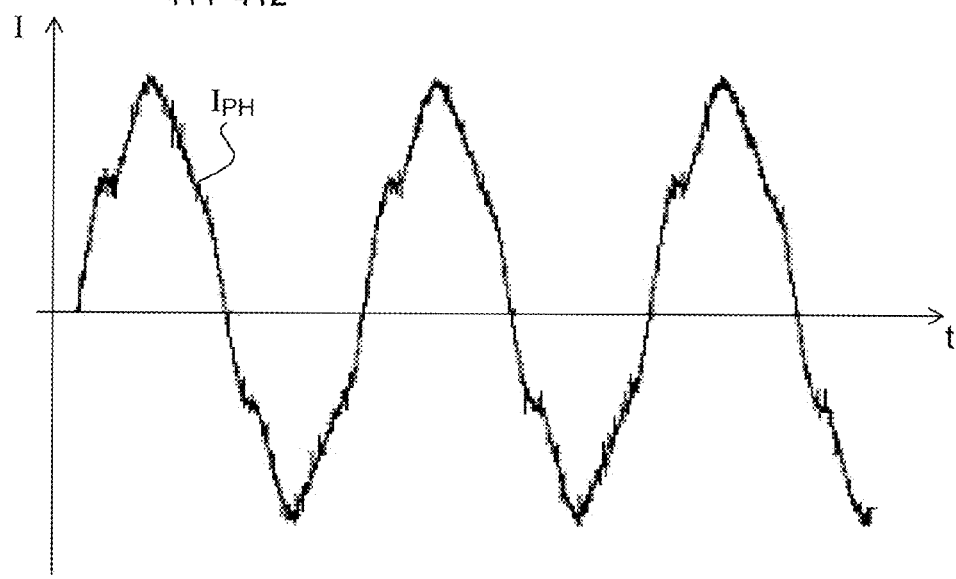

As shown below, the distortion of the current is further diminished by improvements made to the filtering unit 201 placed at the input of the correction circuit according to the invention. The shape of the current benefiting from these improvements is shown in FIG. 4c.

The current $I_{LS}$ remains unchanged (relative to the reading in FIG. 4a) but the shape of the line current is again optimized so that the resultant harmonic distortion is of the order of 5%, namely of a kind to satisfy the strictest requirements, notably those defined by the test marked CE101 of the MIL-STD-461 E standard of the American Defense Department.

Figure 1:
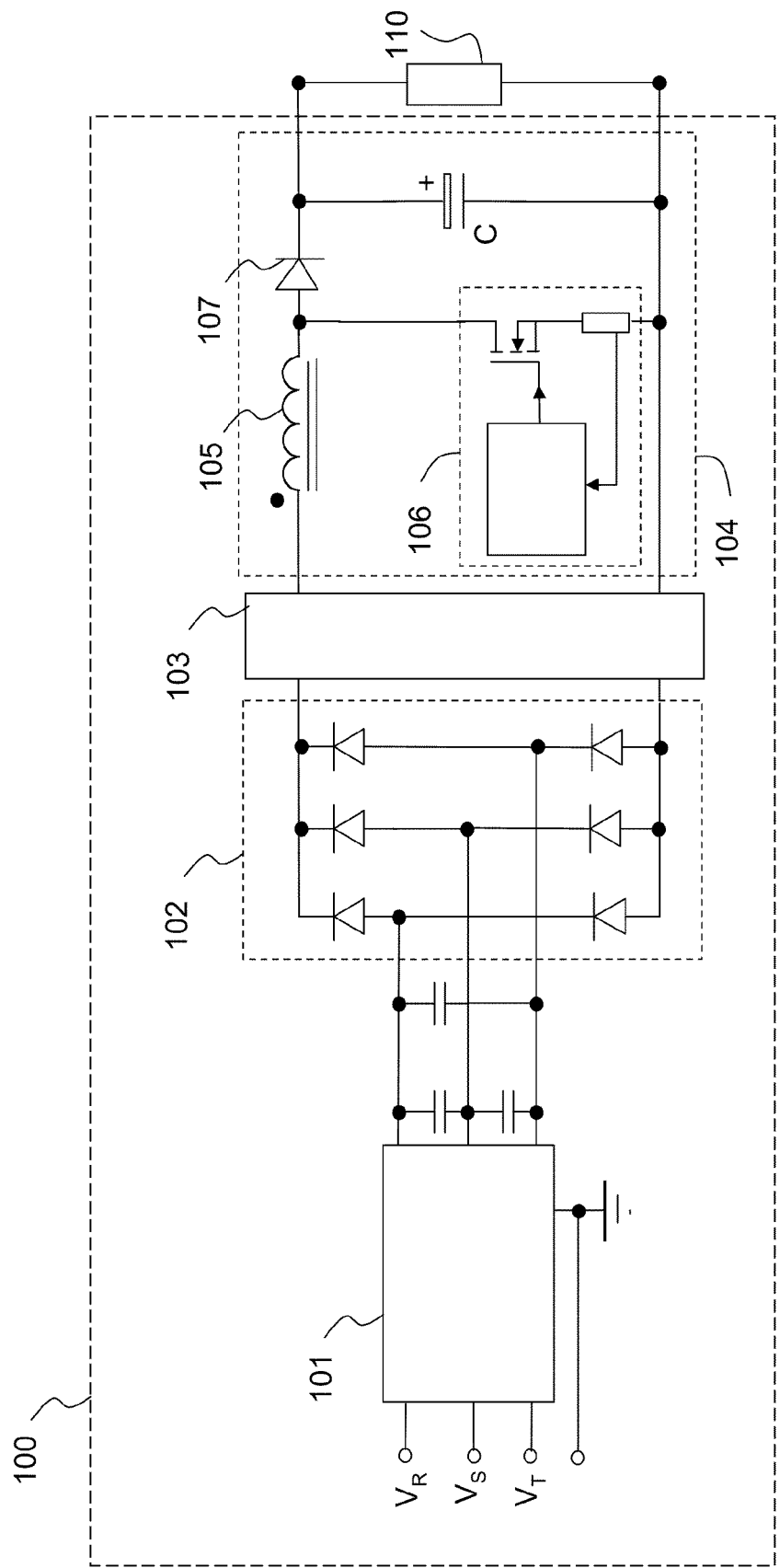
FIG. 1, a correction circuit architecture according to the prior art, the figure has already been explained, FIG. 2, the architecture of an embodiment of a correction circuit optimized according to the invention, FIG. 3a, the illustration of the first phase of the current-chopping cycle carried out by a correction circuit according to the invention, FIG. 3b, the illustration of the second phase of the current-chopping cycle carried out by a correction circuit according to the invention, FIG. 4a, the shape of the current $I_{LS}$ passing through an inductor of the correction circuit according to the invention, and an illustration of the shape of the phase current $I_{PH}$ obtained with said circuit, after an optimization of the inductor value, FIG. 4b, a closer view of the inductor current $I_{LS}$ shown in FIG. 4a, FIG. 4c, an illustration of the shape of the phase current $I_{PH}$ obtained with a correction circuit according to the invention, FIG. 5, a schematic diagram of a filtering unit contained in a correction circuit according to the invention, FIG. 6a, a top view of a filtering unit contained in a correction circuit according to the invention, FIG. 6b, two sections, in side view, of a filtering unit contained in a correction circuit according to the invention, FIG. 7a, a top view of an inductive module present in the filtering module of a correction circuit according to the invention, FIG. 7b, a side view of an inductive module present in the filtering module of a correction circuit according to the invention.

With respect to the architecture shown in FIG. 1, the architecture of FIG. 2 has the advantage of better eliminating the undesirable low-frequency harmonic rays, particularly those of the fifth harmonic and of the seventh harmonic. On the other hand, since the current is modulated at a high rate (for example 70% to 100%) at the chopping frequency, the high-rank harmonic rays are greater than for a correction circuit operating in continuous mode. Therefore, relative to the circuit shown in FIG. 1, the low-frequency filtering can be lightened, while the high-frequency filtering must be improved. Nevertheless, carrying out high-frequency filtering is much less of a disadvantage in terms of space occupancy than low-frequency filtering which requires bulky components.

Figure 5:
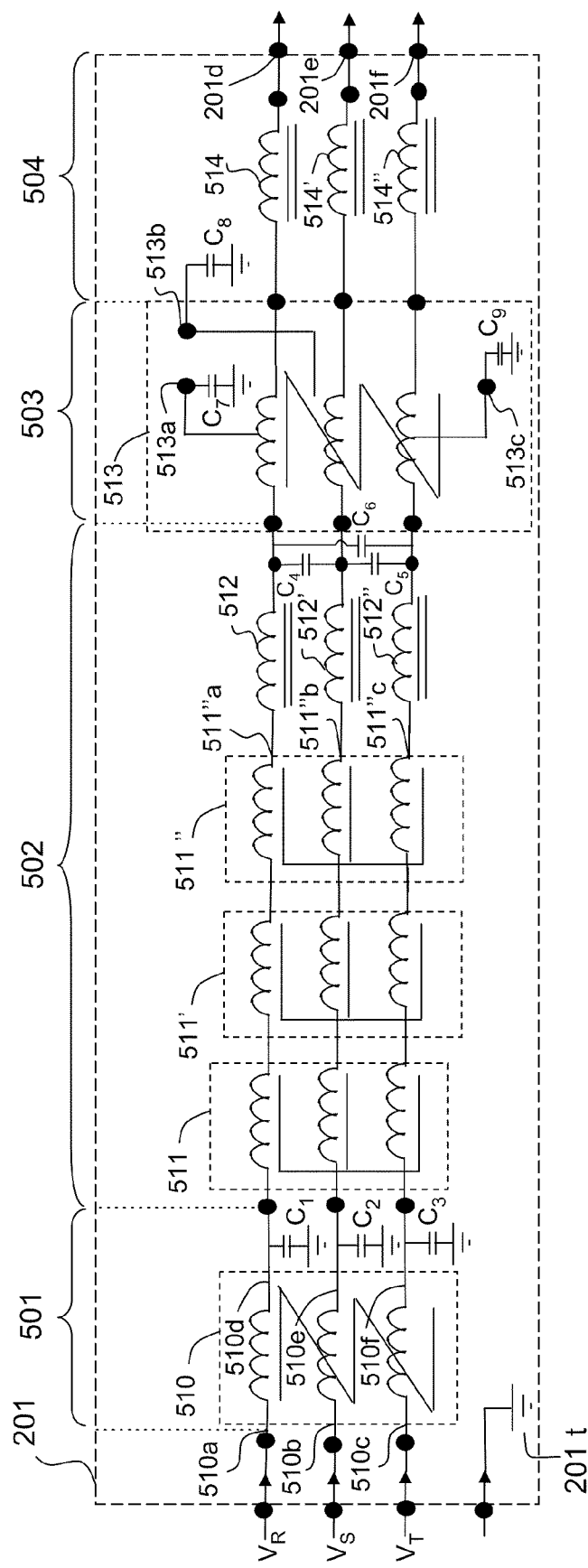

FIG. 5 shows a block diagram of a filtering unit 201 placed at the input of the correction circuit of the embodiment of FIG. 2. The filtering unit 201 comprises a first common-mode filtering cell 501, which is associated in series with a first differential-mode filtering cell 502, which is associated in series with a second common-mode filtering cell 503, which is associated in series with a second differential-mode filtering cell 504.

The first common-mode filtering cell 501 comprises a conventional filtering module 510 place at the head of the filtering unit 201 as close as possible to the input connections 201a, 201b, 201c. This module 510 comprises three inputs 510a, 510b, 510c and three outputs 510d, 510e, 510f, the first input 510a of said module 510 being connected to the first input 201a of the filtering unit 201, the second input 510b of said module 510 being connected to the second input 201b of the filtering unit 201, the third input 510c of said module 510 being connected to the third input 201c of the filtering unit 201. Each of the outputs, respectively 510d, 510e, 510f, of the filtering module 510 is connected to ground via a capacitor, respectively $C_1$, $C_2$, $C_3$.

The first differential-mode filtering cell 502 makes it possible to filter the low-frequency components of the current, that is to say in a frequency band extending substantially from 30 Hz to 15 kHz. This cell 502 comprises an original structure making it possible to reduce its volume compared with a conventional filtering cell. Specifically, said cell 502 comprises one or more three-phase inductive modules 511, 511', 511", in the example, three, associated in series in order to obtain a sufficiently high inductor value. Said inductive modules 511, 511', 511" comprise three inputs 511a, 511b, 511c and three outputs 511d, 511e, 511f each of the inputs corresponding to a current phase of a three-phase network, each of the outputs also. The inductive modules 511, 511', 511" are shown in detail in FIG. 7. Moreover, the first differential-mode filtering cell 502 also comprises, for each current phase, a simple inductor 512, 512', 512", each of these inductors being associated in series with the three-phase inductive module(s) 511, 511', 511". In the example, a first inductor 512 is connected to the first output 511a" of the third inductive module 511", the second inductor 512' is connected to the second output 511b" of the third inductive module 511" and the third inductor 512" is connected to the third output 511c" of the third inductive module 511". The association of simple inductors 512, 512', 512" with the three-phase inductive modules 511, 511', 511" makes it possible to efficiently complete the filtering carried out by said modules 511, 511', 511", notably for the highest frequencies of the low-frequency template, in the example, in the range from 10 to 15 kHz. Specifically, the value of the inductive modules 511, 511', 511" begins to reduce toward 10 kHz. A supplement to the low-frequency filtering is therefore carried out by placing the aforementioned simple inductors 512, 512', 512" in series. These simple inductors 512, 512', 512" are achieved by windings of the same nature as the windings 514, 514', 514" dedicated to the filtering of the high-frequency components of the second differential-mode filtering cell 504, the inductor value of these windings beginning to reduce for much higher frequencies.

Therefore, the simple inductors 512, 512', 512" take over from the inductive modules 511, 511', 511" for the highest frequencies of the low-frequency template involved in the requirements of the standards relating to conducted emissions, notably the CE101 test of the MIL-STD-461E standard.

Moreover, capacitors $C_4, C_5, C_6$ are placed at the output of the simple inductors 512, 512', 512" so that a first capacitor $C_4$ connects the output of the first simple inductor 512 with the output of the second simple inductor 512', a second capacitor $C_5$ connects the output of the second simple inductor 512' with the output of the third simple inductor 512" and a third capacitor $C_6$ connects the output of the first simple inductor 512 with the output of the third simple inductor 512". These capacitors make it possible to promote the rejection of the frequency components generated by the chopping of the current.

The second differential-mode filtering cell 504 makes it possible to eliminate the interference frequency components originating from the chopping of current as illustrated in FIGS. 3a, 3b, that is to say the components the frequency of which is equal to or greater than the chopping frequency.

Moreover, compared with a conventional filtering unit, the filtering unit 201 used in the correction circuit according to the invention comprises a second common-mode filtering cell 503 inserted between the first 502 and the second 504 differential-mode filtering cell. This second filtering cell 503 acts as an isolation buffer between the two differential-mode filtering cells 502, 504. Mid-point outputs 513a, 513b, 513c for each of the three phases of the current are produced. These mid-point outputs connect common-mode capacitors $C_7, C_8, C_9$ of the second common-mode filtering cell 503 to ground.

These capacitors $C_7, C_8, C_9$ are necessary for keeping to the requirements of the input standards of common mode type but they must in no circumstances interfere with the operation of the chopping stage 214 situated downstream of the filtering unit 201. The mid-point outputs 513a, 513b, 513c of the second common-mode filtering cell 503 are therefore added so that the winding portion situated downstream of the capacitors $C_1, C_2, C_3$ serves as an shock inductor so as to prevent the high-frequency components of the current, components originating from the chopping by the controlled switch 214, from re-closing via the common-mode capacitors $C_1, C_2, C_3$ of the second common-mode filtering cell 503. In the absence of this filtering cell 503, current-flow interference loops may appear between said capacitors and the current chopping stage 205, 206. A mid-point output outlet 513a, 513b, 513c is therefore produced for each phase winding in order to allow said capacitors to be wired to ground.

Figure 6A:
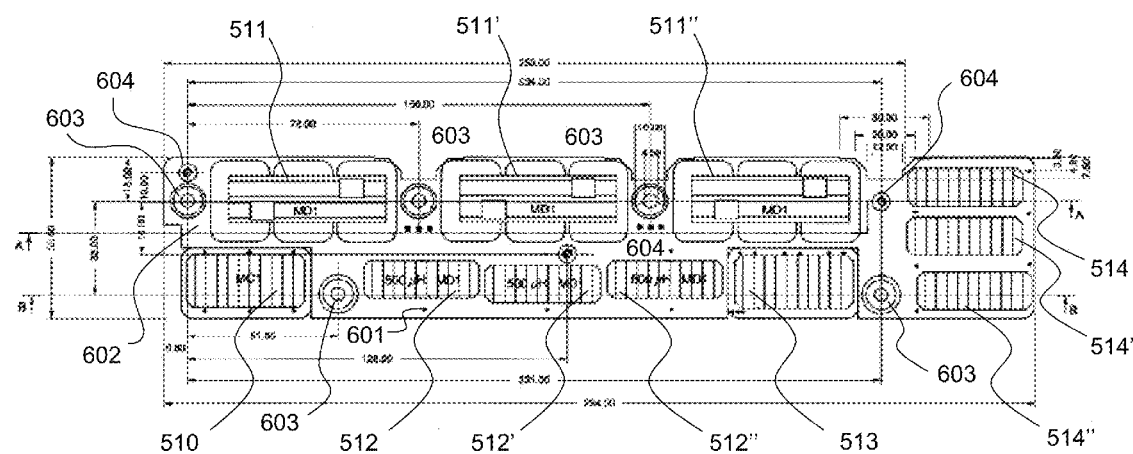

FIG. 6a shows a top view of an embodiment of a filtering unit 201 placed at the input of a correction circuit according to the invention. The inputs and outputs of the inductors 512, 512', 512", 514, 514', 514" and of the inductive modules 511, 511', 511" are shown by dots 601, that is all the differential-mode windings. In the example, the differential-mode filtering cells 502, 504 are incorporated into a molded block 602. Measurements mentioning the dimensions in mm are given in FIG. 6a as an indication in order to give a better idea of the size of the filtering unit 201.

By virtue, notably, of the original structure of the first differential-mode filtering cell 502, the size of the filtering unit 201 is small. As an example, the filtering unit 201, dimensioned for a user circuit 110 (FIG. 2) requiring a power of 1 kW, has the following dimensions: a length of less than 300 mm, a width equal to 55 mm, and a height equal to 48 mm.

Figure 6B:
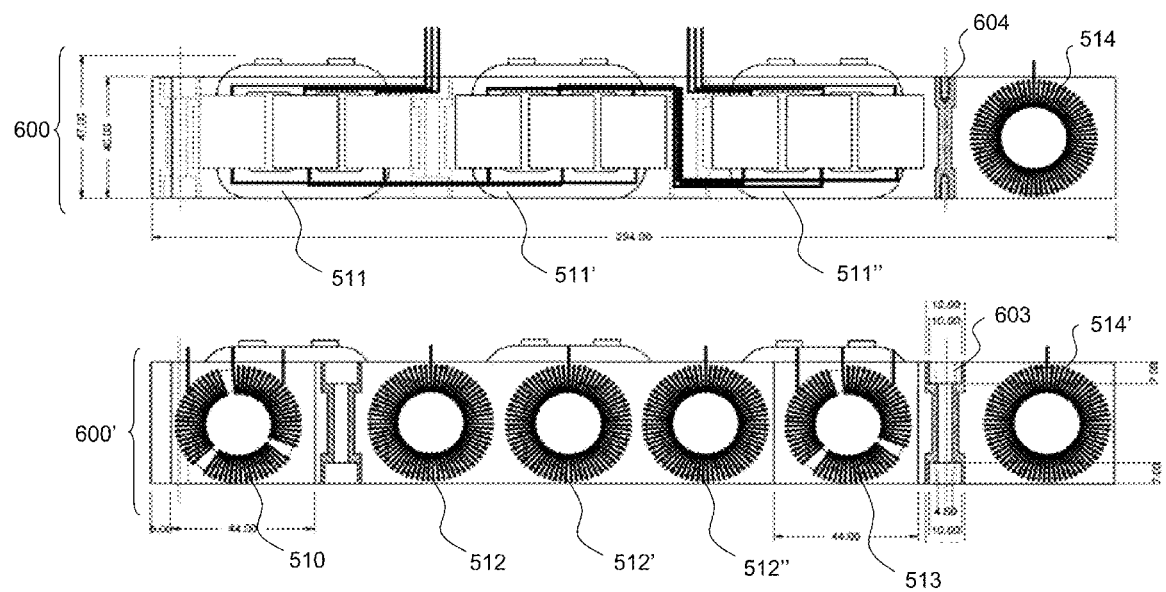

FIG. 6b shows two sections 600, 600' of the filtering unit 201 seen from the side. A first section 600 shows the filtering unit 201 at the inductive modules 511, 511', 511" and a second section shows the filtering unit 201 at the common-mode inductors 510, 513.

In the example of FIGS. 6a and 6b, the assembly of the differential-mode inductors is incorporated into the molded resin block 602, these inductors being the inductive modules 511, 511', 511", the simple inductors 512, 512', 512" of the first differential-mode filtering cell 502 and the simple inductors 514, 514', 514" of the second differential-mode filtering cell 504.

On the other hand, the common-mode inductors 510, 513 being made of a ferrite material having to be protected from the mechanical stresses, these two common-mode inductors 510 and 513 are mounted in a second stage by bonding to the molded resin block 602. Therefore, the filtering unit 201 is formed by the association of the molded block 602 with the common-mode inductors 510 and 513. To hold the assembly of the molded block 602 to the structure of an equipment chassis, a first series of five struts 603 is produced. A printed circuit (not shown in the figures and on which the common-mode and differential-mode capacitors are notably installed) is electrically connected to the molded block 602. Also, a second series of three struts 604 holds said printed circuit mechanically to the molded block 602.

In the embodiment shown in FIGS. 6a and 6b, the assembly of the filtering unit 201 is shielded by a casing, in the example made of μ-metal. The assembly thus shielded is suitable for satisfying the low-frequency radiating requirements, notably for the H magnetic field.

Figure 7A:
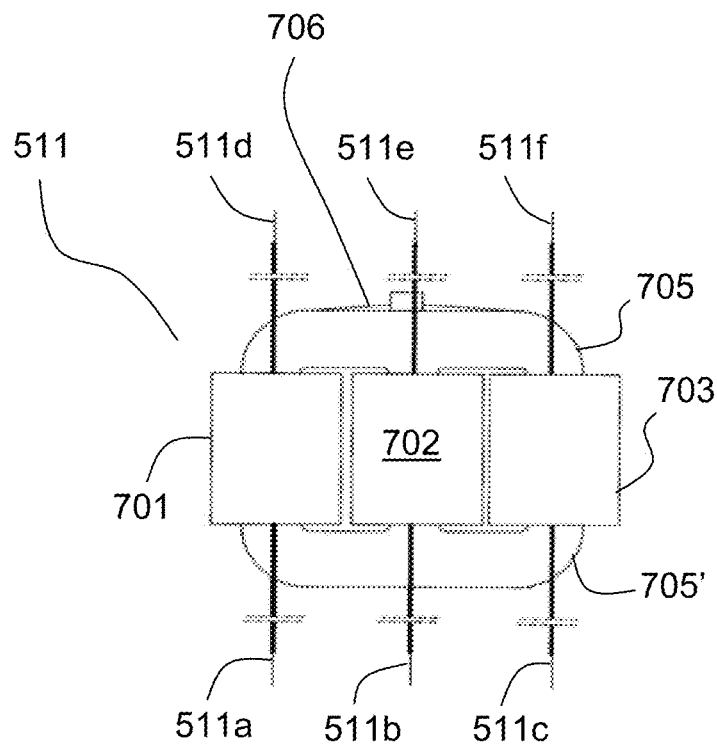
Figure 7B:
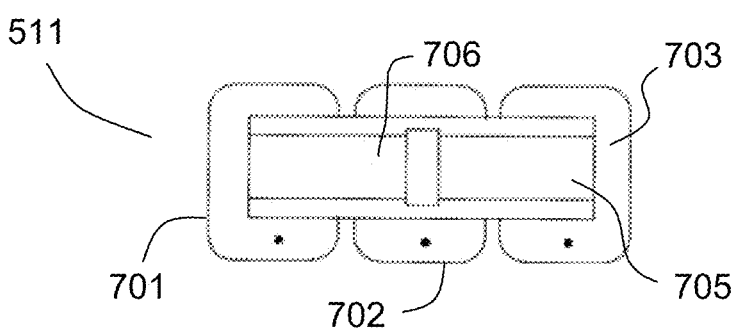

FIGS. 7a and 7b give details of the structure of an inductive module 511 used in the first differential-mode filtering cell 502, the other inductive modules 511', 511" being similar. FIG. 7a shows a top view of the module 511 while FIG. 7b shows a side view of the same module 511. Three elementary windings are wound around one and the same magnetic core. The inductive module 511 is a three-phase inductor: each of the elementary windings is wound around each leg of a double-E circuit 705, 705', the two E-shaped circuits being assembled so that the legs of each "E" are placed one facing the other in order to form a semblance of an "8". In the example, the gap between the two circuits 705, 705' in the shape of an "E" is equal to 0.3 mm. After mounting of the magnetic circuit, one or more turns of tape 706 is positioned around the three elementary windings.

As an indication, in the example, each inductor formed by the elementary winding 701, 702, 703 is 1.35 mH for a current of 3.5 effective amperes. For one and the same inductor value, the inductive module 511 therefore forms a three-phase winding of smaller size that three separate windings.

The electric definition (the three-phase nature of the winding) of the inductive module 511 in the filtering unit 201 makes it possible to further reduce the distortion of the input current. The inclusion of the inductive module 511 makes it possible to go from 15% of harmonic current distortion, that is the line current $I_{pH}$ obtained by virtue of the optimization of the value of the inductors $L_R$, $L_S$, $L_T$, to a harmonic current distortion of, in the example, between 8% and 5%, as illustrated in FIG. 4c.

An advantage of the PFC circuit according to the invention is that it has only one current chopping control, thus simplifying its architecture and its operation. Moreover, the PFC circuit according to the invention is of small size when compared with the three-phase PFC circuits of the prior art, which, for onboard equipment, is sometimes a decisive advantage.

As an illustration, for a primary network producing a three-phase current of 115 VAC at 400 Hz, the correction circuit:

makes it possible, for an input power of 700 W, to obtain a power factor equal to 0.99, and a main SHD (Single Harmonic Distortion) harmonic of less than 9% for the H5 rays of the fifth harmonic and H7 rays of the seventh harmonic (that is to say the H5 and H7 rays respectively at 2000 Hz and 2800 Hz);

makes it possible, for an input power of 1 kW, to obtain a power factor equal to 0.95, an SHD equal to 6% for the ray of the fifth harmonic and 2% for the ray of the seventh harmonic, the distortion ratio for the other rays being less than 2%.

These performances are notably compatible with complying with the CE101 test of the MIL-STD-461E standard.

What is claimed is:

1. A correction circuit of the power factor of a circuit for a three-phase electric network, comprising:

a filtering unit at the input of said correction circuit receiving the three phases of the current, at least one inductor per phase of current placed downstream of the filtering unit, and a rectifying bridge powering a current-chopping stage, wherein the filtering unit comprises at least one differential-mode filtering cell comprising at least one inductive circuit formed of a single magnetic material in a double E, each leg of the E being surrounded by a winding, the values of the inductors being chosen so that said correction circuit operates at the boundary between the continuous mode and the discontinuous mode, and wherein the filtering unit includes a first common-mode filtering cell, associated in series with a first of the at least one differential-mode filtering cell, and a second differential-mode filtering cell, wherein the filtering unit also comprises a second common-mode filtering cell comprising a mid-point output and inserted between the first differential-mode filtering cell and the second differential-mode filtering cell.

2. The correction circuit as claimed in claim 1, wherein the first differential-mode filtering cell comprises a simple inductor per phase of current, each of these simple inductors being associated in series with an output of the inductive circuit.

3. The correction circuit as claimed in claim 1, wherein the second differential-mode filtering cell includes simple inductors, wherein the assembly of the differential-mode inductors is incorporated into a molded resin block, said assembly including the inductive modules and of the simple inductors of the first differential-mode filtering cell and of the simple inductors of the second differential-mode filtering cell.

4. The correction circuit as claimed in claim 1, wherein the common-mode inductors are formed based on a ferrite material.

5. A power supply unit comprising a power-factor correction circuit as claimed in claim 1.

* * * * *